March 21, 1933.  G. F. DICKSON  1,902,543
MEANS AND METHOD OF MARKING CONTAINERS FOR ICE CREAM AND THE LIKE
Original Filed July 3, 1931
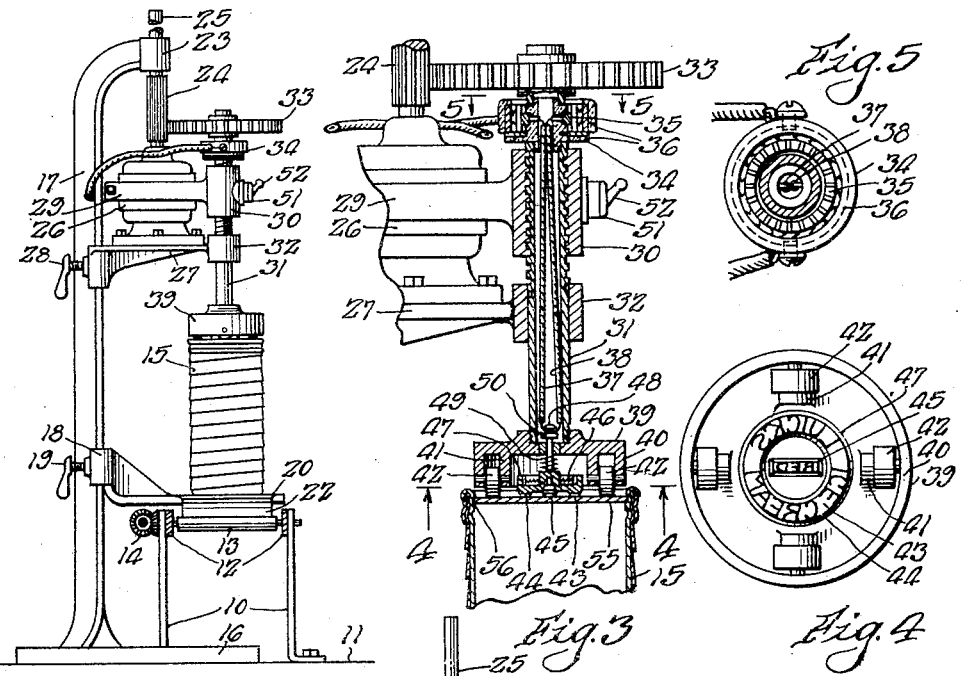
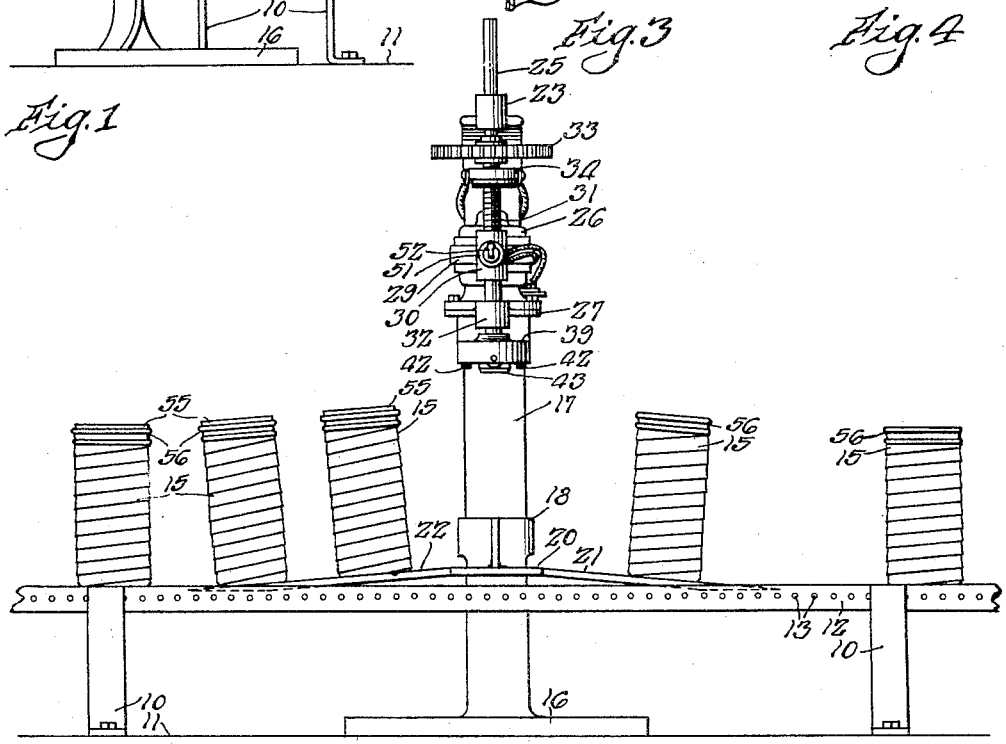
Inventor:
George F. Dickson Patented Mar. 21, 1933

1,902,543

UNITED STATES PATENT OFFICE

GEORGE F. DICKSON, OF CHICAGO, ILLINOIS, ASSIGNOR TO GEORGE A. PEARSON AND LESLIE MUTER, BOTH OF CHICAGO, ILLINOIS

MEANS AND METHOD OF MARKING CONTAINERS FOR ICE CREAM AND THE LIKE

Original application filed July 3, 1931, Serial No. 548,577. Divided and this application filed March 18, 1932. Serial No. 599,835.

The present invention has to do with a means and a method of marking the surfaces of ice cream and other containers. It has particularly to do with the placing of indicia thereon and particularly changeable indicia upon the cover parts for such containers.

In applications for Letters Patent heretofore filed by the present applicant, there have been described means and methods for the production of ice cream and other containers from wood pulp, processes whereby such containers may be made heat conductive and not insulators, and formulæ for obtaining the last described result.

As the container heretofore described is intended to be assembled in an ice cream plant or other plant just anterior to use, and because there has always been an insufficient means for quickly and accurately identifying the flavor of ice cream after it has been packaged in containers, the present invention has been conceived to provide a ready means for marking ice cream packages and other containers. As the ice cream which is sold in this country is of several well known varieties, it is desirable to provide in the machine changeable marking devices.

While much of the discourse herein will be directed to the ice cream industry, it is to be understood at all times that the invention is in no way limited thereto.

The objects of the invention include, among others, a new and novel means for marking ice cream and other containers; a new and unique device for stamping containers or the like with changeable indicia; and an improved apparatus for marking changeable data upon a container cover and concurrently forcing the cover into position into a container.

These objects, and such other objects as may hereinafter appear, are obtained by the novel construction, unique combination, and improved arrangement of the several elements which constitute the invention, one form of which is illustrated in the accompanying drawing, the said single form of the invention therein illustrated being adapted for use with ice cream containers.

In said drawing:

Figure 1 is a side elevation of a machine embodying the subject matter of the present invention;

Figure 2 is a front elevation of the machine shown in Figure 1;

Figure 3 is a vertical section through the machine shown in Figure 1;

Figure 4 is a horizontal section on the line 4—4 of Figure 3; and

Figure 5 has a similar connection to the line 5—5 of Figure 3.

Like parts are designated in the drawing and in the description which follows by the same reference characters.

In association with the machine to be hereinafter described, it is customary but not necessary to provide a conveyor system for bringing containers one at a time to the machine and to carry such containers away after each has been marked. Such conveyor system in the present instance comprises a roller conveyor of a well known type. It includes standards or brackets 10 secured to a floor or other support 11.

Longitudinal members 12 are secured to the standards or brackets 10, and provide journals for rollers 13 which reach from one horizontal member 12 to another.

Any suitable prime mover, not shown, may be employed to actuate the rollers 13, gearing 14 being shown to illustrate the manner of transferring the energy of the prime mover to the conveyor system.

Ice cream containers or other containers 15, after being filled are conveyed along the rollers 13 from a depositor, or other filling apparatus, not shown, to the machine forming the subject matter of the present application.

From a base 16, a standard 17 projects vertically. Adjustable therealong is a bracket 18, there being in bracket 18 a set screw 19 which projects therethrough to engage the standard 17 to maintain the bracket 18 in any selected position.

The outer end of the bracket 18 includes a platform 19 upon which a container 15 is seated when being marked in the present device. On each side of the platform 20 are inclines 21 and 22, the former to assist in the elevation of the containers 15 from the rollers 13 to the platform 20 and the latter to allow the ready return thereof to the rollers 13.

The other end of the standard 17 terminates in a boss 23 in which is journaled the end of a gear shaft 24 which may be secured to or integral with a shaft 25 of a motor 26 attached to a bracket 27 adjustable on standard 17 and secured thereon by a set screw 28.

About the housing for the motor 26 is a bracket 29 which terminates in a sleeve 30 forming a journal for a shaft 31. There is also a sleeve 32 at the end of the bracket 27 for journaling said shaft 31. The shaft 31 is threaded in one or both of the brackets 30 and 32. At its uppermost extremity said shaft 31 is provided with a gear 33 which meshes with gear 24. Intermediate the sleeve 30 and gear 33 is a head 34 having an external part to which lead wires may be attached. Within the head 34 are suitable contacts 35 and insulation 36. From the contacts 35, conduits 37 and 38 depend downwardly in the shaft 31, which is preferably hollow, as shown.

At the lower end of the shaft 31 there is a circular frame 39 which has a depending flange 40. Any suitable means may be employed to secure the frame 39 upon shaft 31. Angularly spaced in the frame 39 are a number of lugs 41. In the drawing, these are shown 90 degrees apart. Journaled in the lugs 41 and flange 40 are rollers 42. Within the central area of the frame 39 is a stamping die 43. Said die may comprise a permanent section 44 and a replaceable section 45. Any selected letters or insignia may be provided in said sections.

The sections 44 and 45 are adapted to be heated by resistance coils 46, the coils 46 being secured to the frame 47 upon which the sections 44 and 45 are disposed.

A stem 48 extends from the frame 47 through the frame 39, there being a spring 49 thereabout to urge the frame 47 downwardly at all times. The limit of such downward movement is defined by the head 50 at the other side of the frame 39. The conduits 37 and 38 are electrically connected to the heating elements 46 so that the elements may readily be energized.

For controlling the energies of the heating elements 46, a switch 51 may be used. This may be disposed on the bracket 30 or elsewhere, as convenience directs. Switch 51 has an operating handle 52 in a position for handy manipulation.

The same switch 51 may also be employed to control the operation of the motor 26 although a different switch may be supplied therefor.

It will be noted that the frame 47 extends below the level of the rollers 42 and that upon the sections 44 and 45 coming into contact with the cover 55 of a container 15, the frame will be depressed inwardly of the frame 29 to adapt itself to the plane of the cover. A firm but elastic engagement between sections 44 and 45 and the cover is thus furnished.

In use, the machine generally is associated with a conveyor system. Containers 15 without top 55 are brought up the inclined plane 21. A cover 55 may then be manually placed on the top of the container 15. The container so treated is then moved under the frame 30. The motor 26 is energized and concurrently the heating elements 46 are energized.

As the motor 26 rotates, the shaft 31 moves downwardly, the gear 24 being elongated to compensate for the movement of the gear 33 downwardly with the shaft 31. The frame 47 with the die sections 44 and 45 thereon engages the top 55 of the container 15, whereupon the letters or insignia in the sections 44 and 45 impinge the top 55 to provide an outline on the sections 44 and 45 corresponding to such letters.

The rollers 42 next engage the top 55 and force it inwardly of the container 15 until the top 55 is firmly seated in the beading 56 adjacent the top thereof. The rotating movement of the frame 49 insures uniform pressure upon the top 55 whereby the latter is forced into a level position in the container.

As pointed out previously, the dies 44 and 45 rest firmly on the cap 55, not rotating with the frame 39, slowly scorching the design of the dies engaging the material of the top 55 into such material.

When the cap 55 is pressed inwardly the proper distance, the switch 51 is opened, and the motor is then reversed to raise the frame 39 from the top 55. The lift from motor action is sufficient to clear the dies 44 and 45 from the top 55, after which the container 15 is moved so that it will slide down the incline 22 and in that way return to the conveyor system.

During the downward and the upward movement of the frame 39, the frame 47 does not rotate therewith but remains stationary. The commutator in the head 34 permits of an uninterrupted flow of current through the resistance units 46 so that such units are constantly energized without any danger of the lead in the wires becoming entangled or twisted.

This application is a division of applicant's former application, Serial Number 548,577, filed July 3, 1931.

I claim:

1. Cap seating and marking apparatus comprising a standard, a head on said standard, branding dies in said head, means for heating said branding dies, and means for maintaining said branding dies in contact with a cap while said head is rotating.

2. Cap seating and marking apparatus comprising a standard, a head on said standard, a branding die in said head, means for heating said branding die, means for maintaining said branding die in fixed contact wth a cap, and means for rotating said head while said branding die is so positioned.

3. Cap seating and marking apparatus comprising a standard, a head on said standard, branding dies in said head and adapted to move longitudinally therewith, means for heating said branding dies, and means for rotating said head relatively to said branding dies.

4. Cap seating and marking apparatus comprising a head, a branding die in said head, means for heating said branding die, and means for rotating said head relatively to said branding die.

5. A container topping device having a head movable into a container, and means for branding a top as said head moves such top into a container and into a selected position therein.

6. A container capping and marking device comprising a conveyor, a marking device in the path of said conveyor, said marking device having a standard, brackets thereon, a head supported by said brackets, said head having therein a fixed branding die and a removable branding die, and means for forcing a cap into a container in said conveyor as said dies brand said top.

7. In combination, a cap seating and marking device comprising a standard, a head movable therealong and having rollers to engage a cap, dies in said head, and means for rotating said rollers around said die.

8. The combination described in claim 7, and in which said rollers are movable axially of said head.

GEORGE F. DICKSON.